(12) United States Patent
Miyake et al.

(10) Patent No.: US 11,804,606 B2
(45) Date of Patent: Oct. 31, 2023

(54) GAS DIFFUSION ELECTRODE, METHOD FOR PRODUCING THE SAME AND MEMBRANE ELECTRODE ASSEMBLY

(71) Applicant: Toray Industries, Inc., Tokyo (JP)

(72) Inventors: Toru Miyake, Otsu (JP); Michiko Minomo, Otsu (JP); Sho Kato, Otsu (JP)

(73) Assignee: TORAY INDUSTRIES, INC., Tokyo (JP)

( * ) Notice: Subject to any disclaimer, the term of this patent is extended or adjusted under 35 U.S.C. 154(b) by 40 days.

(21) Appl. No.: 17/629,045

(22) PCT Filed: Jul. 22, 2020

(86) PCT No.: PCT/JP2020/028493
§ 371 (c)(1),
(2) Date: Jan. 21, 2022

(87) PCT Pub. No.: WO2021/020288
PCT Pub. Date: Feb. 4, 2021

(65) Prior Publication Data
US 2022/0278336 A1 Sep. 1, 2022

(30) Foreign Application Priority Data
Jul. 29, 2019 (JP) .................. 2019-138579

(51) Int. Cl.
*H01M 4/88* (2006.01)
*H01M 4/86* (2006.01)
*H01M 8/1004* (2016.01)

(52) U.S. Cl.
CPC ....... *H01M 4/8807* (2013.01); *H01M 4/8605* (2013.01); *H01M 4/8875* (2013.01); *H01M 8/1004* (2013.01)

(58) Field of Classification Search
None
See application file for complete search history.

(56) References Cited

U.S. PATENT DOCUMENTS

| | | | | |
|---|---|---|---|---|
| 2002/0192536 | A1* | 12/2002 | Peinecke | H01M 4/8807 451/28 |
| 2013/0059226 | A1* | 3/2013 | Gomi | H01M 4/8807 429/480 |

(Continued)

FOREIGN PATENT DOCUMENTS

| | | | |
|---|---|---|---|
| EP | 1365464 A2 * | 11/2003 | H01M 8/0202 |
| JP | 3368907 B2 | 1/2003 | |

(Continued)

OTHER PUBLICATIONS

International Search Report and Written Opinion for International Application No. PCT/JP2020/028493, dated Oct. 6, 2020, 6 pages.

*Primary Examiner* — Haroon S. Sheikh
(74) *Attorney, Agent, or Firm* — RATNERPRESTIA

(57) ABSTRACT

An object of the present invention is to provide a gas diffusion electrode that is less likely to cause damage to an electrolyte membrane or the like due to fluff in an outer peripheral portion during production of a membrane electrode assembly. The present invention provides a gas diffusion electrode including a conductive porous substrate containing carbon fibers and a microporous layer formed on a surface of the conductive porous substrate, in which the gas diffusion electrode satisfies at least one of the following (1) and (2): (1) the number of carbon fibers protruding from an edge portion by 20 μm or more when viewed from a plane surface is less than 1.0 number/cm with respect to a length of the edge portion; and (2) the number of carbon fibers that are inclined at an angle of 30° or more in an in-plane direction of the gas diffusion electrode and have lengths of 10 μm or more when viewed from a side surface of the edge (Continued)

portion is less than 1.0 number/cm with respect to the length of the edge portion.

14 Claims, 8 Drawing Sheets

(56) References Cited

U.S. PATENT DOCUMENTS

| | | | | |
|---|---|---|---|---|
| 2014/0087272 A1* | 3/2014 | Takeuchi | ............ | H01M 4/8652 |
| | | | | 429/405 |
| 2015/0372332 A1* | 12/2015 | Okano | ................ | H01M 8/0241 |
| | | | | 429/534 |
| 2017/0237079 A1* | 8/2017 | Tanimura | ............ | H01M 8/0234 |
| | | | | 429/534 |
| 2018/0069245 A1* | 3/2018 | Inoue | ................ | H01M 8/0234 |
| 2019/0006682 A1* | 1/2019 | Okano | ................ | H01M 4/8807 |
| 2019/0165379 A1* | 5/2019 | Kajiwara | ............... | D04H 1/495 |
| 2019/0214651 A1* | 7/2019 | Shigeta | ................ | H01M 4/861 |
| 2022/0199968 A1* | 6/2022 | Child | .................... | H01M 4/134 |

FOREIGN PATENT DOCUMENTS

| | | | |
|---|---|---|---|
| JP | 2005149803 A | 6/2005 |
| JP | 2007005122 A | 1/2007 |
| JP | 2016091997 A | 5/2016 |
| JP | 2019167651 A | 10/2019 |

* cited by examiner

GAS DIFFUSION ELECTRODE, METHOD FOR PRODUCING THE SAME AND MEMBRANE ELECTRODE ASSEMBLY

CROSS REFERENCE TO RELATED APPLICATIONS

This is the U.S. National Phase application of PCT/JP2020/028493, filed Jul. 22, 2020, which claims priority to Japanese Patent Application No. 2019-138579, filed Jul. 29, 2019, the disclosures of each of these applications being incorporated herein by reference in their entireties for all purposes.

FIELD OF THE INVENTION

The present invention relates to a gas diffusion electrode used in a fuel cell, in particular, a polymer electrolyte fuel cell that is being developed mainly for vehicle use.

BACKGROUND OF THE INVENTION

The fuel cell is a device that electrically extracts energy generated when water is generated by reacting hydrogen with oxygen, and is expected to be clean energy because the fuel cell has high energy efficiency and emits only water.

An electrode used in the polymer electrolyte fuel cell has a structure including a catalyst layer formed on a surface of a polymer electrolyte membrane of both surfaces of the polymer electrolyte membrane and a gas diffusion layer formed on the outside of the catalyst layer. A gas diffusion electrode is distributed as an individual member for forming the gas diffusion layer in the electrode. As the gas diffusion electrode, a gas diffusion electrode in which a dense layer called a microporous layer (MPL) is formed on a conductive porous substrate is generally used. As the conductive porous substrate of the gas diffusion electrode, a substrate containing carbon fibers is generally used in terms of chemical stability.

One cell of the fuel cell has a structure in which a catalyst layer is disposed on each of both sides of an electrolyte membrane, a gas diffusion electrode is further disposed on each of both outer sides, a member called a membrane electrode assembly (MEA) is formed by pressing from both sides, and the MEA is further laminated by a bipolar plate with a gas flow path. During the pressing, a pressure is concentrated in an outer peripheral portion of the gas diffusion electrode, and thus, the carbon fibers constituting the conductive porous substrate pierce the catalyst layer of the electrolyte membrane, which may cause damage. In order to avoid this, as disclosed in Patent Document 1 or the like, a technique of disposing a protective film in the outer peripheral portion of the gas diffusion electrode is known.

Further, in order to avoid occurrence of a step due to protective film riding on the gas diffusion layer as described in Patent Document 1, Patent Document 2 discloses a technique for forming a step by pressing the outer peripheral portion of the gas diffusion electrode in advance or by not providing the microporous layer only in the outer peripheral portion of the gas diffusion electrode so that a thickness of the protective film is reduced in a case of an MEA.

PATENT DOCUMENTS

Patent Document 1: Japanese Patent No. 3368907
Patent Document 2: Japanese Patent Laid-open Publication No. 2005-149803

SUMMARY OF THE INVENTION

However, when the outer peripheral portion of the gas diffusion electrode is locally pressed, the carbon fibers in the conductive porous substrate may cause damage to the electrolyte membrane. In addition, in a case where the microporous layer is not provided at the outer peripheral portion of the gas diffusion electrode, gas passes through only the substrate without passing through the microporous layer depending on a contact state with the protective film, which may cause gas leakage or local condensation of water vapor. As such, the technique described in Patent Document 2 can avoid an adverse effect caused by the protective film riding on the gas diffusion layer, but has a new factor that causes deterioration of a cell performance.

An object of the present invention is to provide a gas diffusion electrode that is less likely to cause damage to an electrolyte membrane or the like in an outer peripheral portion during production of an MEA.

The present invention according to exemplary embodiments provides a gas diffusion electrode including a conductive porous substrate containing carbon fibers and a microporous layer formed on at least one surface of the conductive porous substrate, in which the gas diffusion electrode satisfies at least one of the following (1) and (2):

(1) the number of carbon fibers protruding from an edge portion by 20 μm or more when viewed from a plane surface is less than 1.0 number/cm with respect to a length of the edge portion; and (2) the number of carbon fibers that are inclined at an angle of 30° or more in an in-plane direction of the gas diffusion electrode and have lengths of 10 μm or more when viewed from a side surface of the edge portion is less than 1.0 number/cm.

In addition, the present invention provides a method for producing the gas diffusion electrode of the present invention, and the method for producing the gas diffusion electrode includes a cutting process using laser processing.

Since the gas diffusion electrode according to embodiments of the present invention has no or significantly little fluff at an edge portion thereof, the fluff is less likely to cause damage to the electrolyte membrane, and there is no bad effect by applying the protective film to the edge portion, such that a highly durable fuel cell can be obtained using a gas diffusion layer for a fuel cell.

DETAILED DESCRIPTION OF EMBODIMENTS OF THE INVENTION

Figure 1:
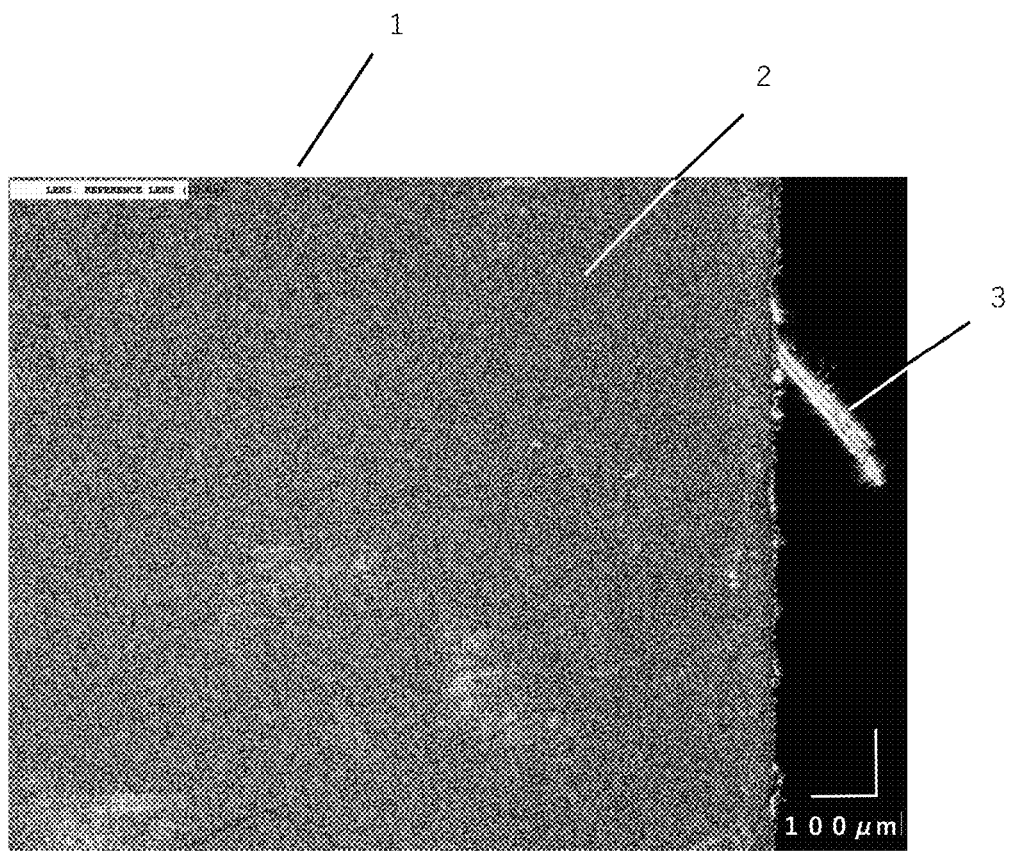
FIG. 1 is a laser micrograph of a plane surface including an edge portion of a shear cut gas diffusion electrode.
Figure 2:
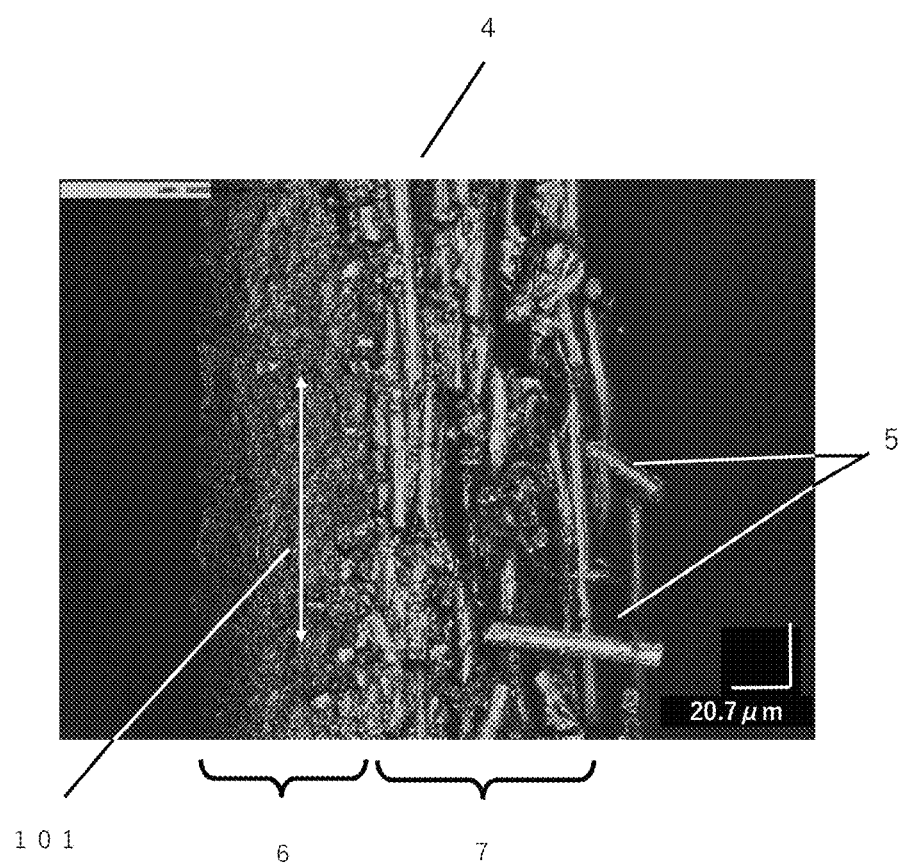
FIG. 2 is a laser micrograph of a cross section of the edge portion of the shear cut gas diffusion electrode.
Figure 3:
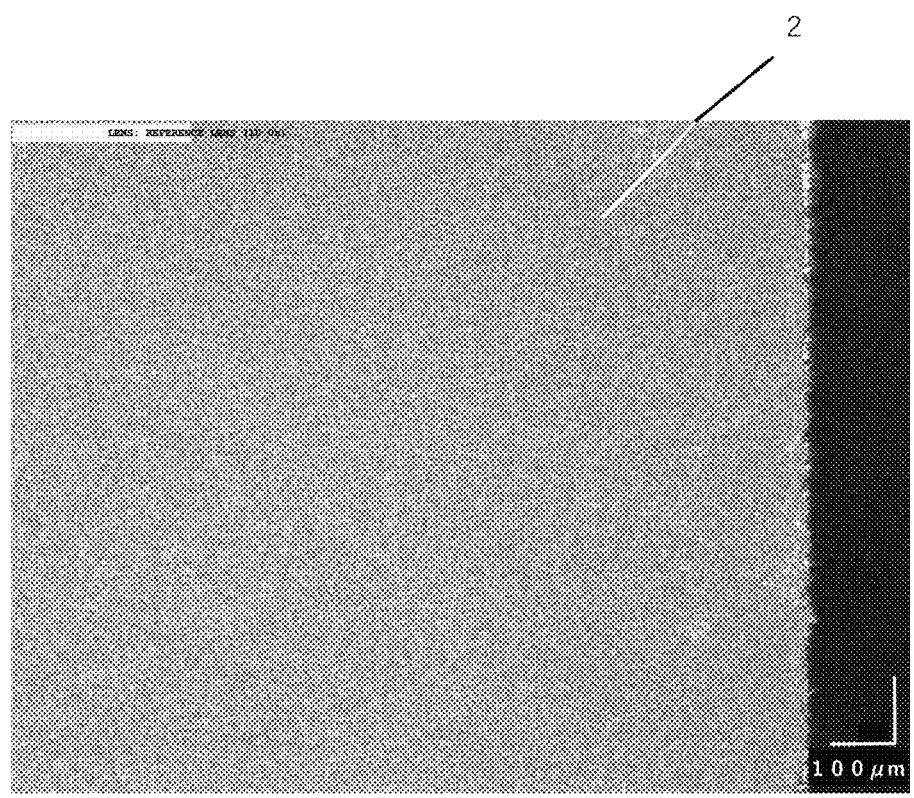
FIG. 3 is a laser micrograph of a plane surface including an edge portion of a gas diffusion electrode according to embodiments of the present invention that is cut by laser.
Figure 4:
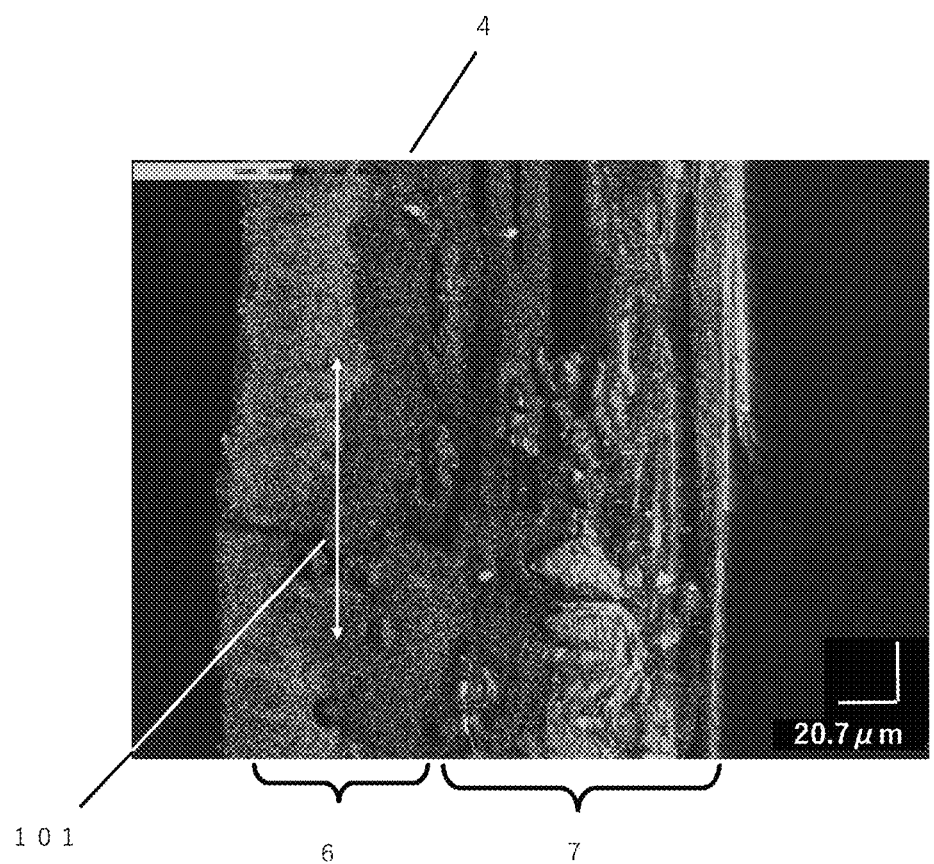
FIG. 4 is a laser micrograph of a cross section of the edge portion of the gas diffusion electrode according to embodiments of the present invention that is cut by laser.
Figure 5:
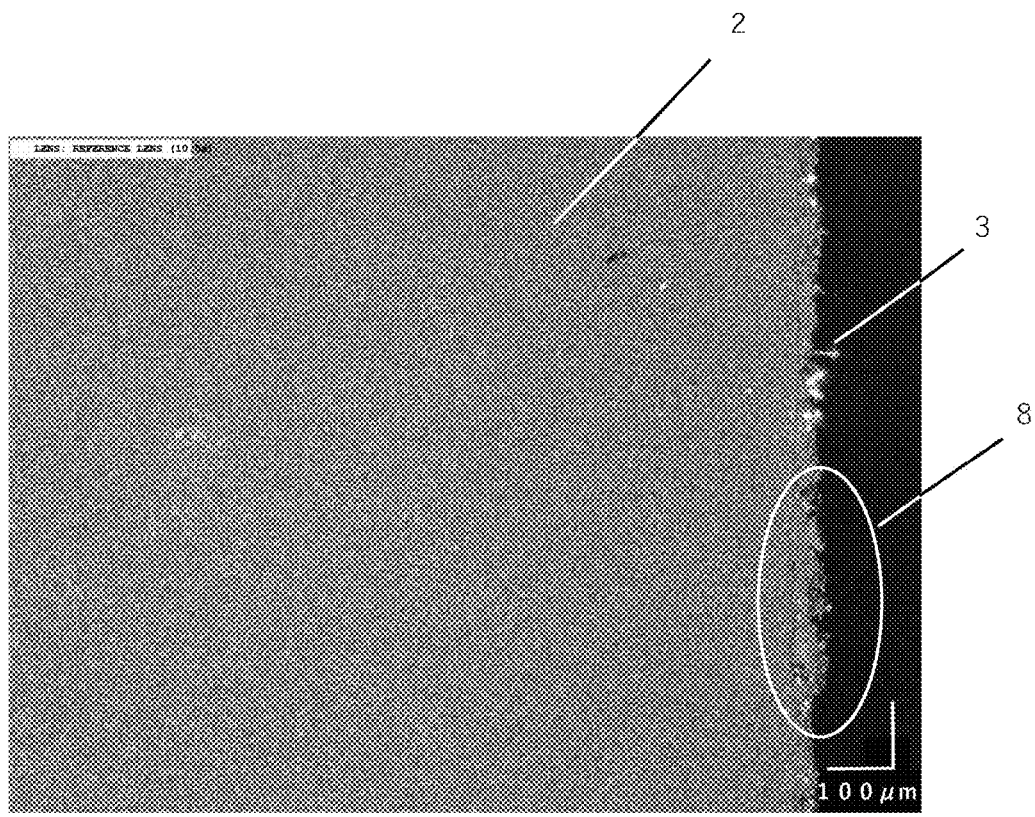
FIG. 5 is a laser micrograph of a plane surface including an edge portion of a gas diffusion electrode according to the related art that is cut by a Thomson cutter.
Figure 6:
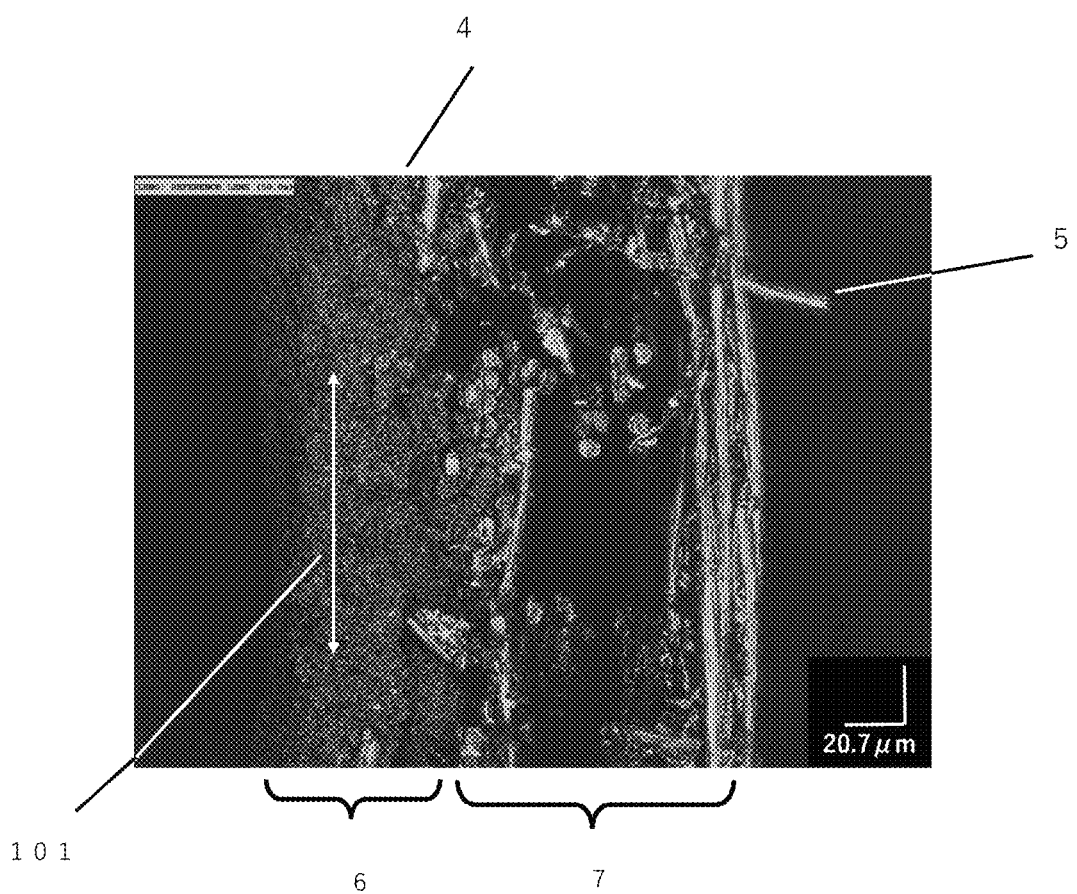
FIG. 6 is a laser micrograph of a cross section of the edge portion of the gas diffusion electrode according to the related art that is cut by a Thomson cutter.

A gas diffusion electrode according to embodiments of the present invention includes a conductive porous substrate. In embodiments of the present invention, the conductive porous substrate (hereinafter, may be simply referred to as a "substrate") contains carbon fibers. In the present invention, examples of specific aspects of the conductive porous substrate containing carbon fibers can include a carbon fiber woven fabric, a carbon fiber papermaking substrate, a carbon fiber non-woven fabric, a carbon fiber felt, a carbon paper (refers to a sheet obtained by binding a carbon fiber papermaking substrate with resin carbide), and a carbon cloth. Among them, a carbon fiber felt, a carbon paper, and a carbon cloth are preferable in terms of excellent corrosion resistance, and further, a carbon paper is more preferable in terms of a property of absorbing a dimensional change in a thickness direction of an electrolyte membrane, that is, a "spring property".

It is preferable that the conductive porous substrate has a region in which a peak of a pore size distribution is 10 μm or more and 100 μm or less. Therefore, the gas diffusion electrode of the present invention can obtain high gas diffusivity for diffusing gas supplied from a bipolar plate in a polymer electrolyte fuel cell to a catalyst and a high drainage performance for discharging water generated by an electrochemical reaction to the bipolar plate.

A pore size and a distribution thereof can be determined by a pore size distribution measurement by a mercury porosimeter. The pore size of the conductive porous substrate may be determined by measuring only the conductive porous substrate or may be determined by measuring the gas diffusion electrode after formation of a microporous layer. In a case where the gas diffusion electrode is measured, each layer structure is confirmed by observing a cross section perpendicular to a plane of the gas diffusion electrode (hereinafter, perpendicular to a plane refers to a thickness direction, and the cross section perpendicular to a plane refers to a cross section parallel to the thickness direction) with scanning electron microscopy (SEM), and a size of a pore portion is approximately determined by an SEM image. Subsequently, a pore size of each layer is determined while associating a peak of the pore size of each layer obtained by a mercury porosimeter with an approximate value obtained by the SEM image.

In order to increase gas diffusivity of the gas diffusion electrode, a porosity of the conductive porous substrate is preferably 80% or more and more preferably 85% or more. An upper limit of the porosity is 95%, which is the limit at which the conductive porous substrate can maintain a structure thereof. The porosity of the conductive porous substrate is measured as follows. First, a cross section perpendicular to a plane in a thickness direction is cut out by an ion milling device (Model IM4000, manufactured by Hitachi High-Technologies Corporation, its equivalent can be used), and the cross section is observed with scanning electron microscopy (SEM). Then, a void portion and a non-void portion that are in contact with the cross section are binarized, and a proportion (percentage) of an area of the void portion to a total area is defined as a porosity (%). Note that the porosity of the conductive porous substrate may be measured by directly using the conductive porous substrate before formation of a microporous layer or may be measured by using the gas diffusion electrode after formation of a microporous layer.

In addition, since the gas diffusivity of the gas diffusion electrode can be increased by reducing a thickness of the conductive porous substrate, the thickness of the conductive porous substrate is preferably 220 μm or less and more preferably 150 μm or less.

As the conductive porous substrate, a substrate subjected to a water repellent treatment is preferably used. The water repellent treatment is preferably performed using a water repellent resin such as a fluoropolymer. Examples of the fluoropolymer include polytetrafluoroethylene (PTFE) (for example, "Teflon" (registered trademark)), fluorinated ethylene propylene (FEP) (an ethylene tetrafluoride-propylene hexafluoride copolymer), perfluoroalkoxy alkane (PFA) (a perfluoroalkoxy fluoride resin), ethylene tetrafluoroethylene (ETFE) (an ethylene tetrafluoroethylene copolymer), polyvinylidene fluoride (PVDF), and polyvinyl fluoride (PVF), and PTFE or FEP that exhibits strong water repellency is preferable.

The amount of the water repellent resin is not particularly limited, and preferably 0.1% by mass or more and 20% by mass or less with respect to 100% by mass of the entire conductive porous substrate. Within this range, the water repellency is sufficiently exhibited, and it is unlikely that pores serving as a diffusion path or a drainage path of gas will be clogged or electrical resistance will be increased.

As a method for subjecting the conductive porous substrate to the water repellent treatment, in addition to a commonly known method of dipping a conductive porous substrate in a dispersion containing a water repellent resin, a method of coating a water repellent resin to a conductive porous substrate by die coating, spraying, or the like can also be applied. In addition, processing by a dry process such as sputtering of a fluoropolymer can also be applied.

Note that after the water repellent treatment, a dry process and further a sintering process may be added, if necessary.

The gas diffusion electrode according to embodiments of the present invention includes a microporous layer formed on at least one surface of the conductive porous substrate. The microporous layer plays important roles in:
 (1) protecting a catalyst,
 (2) repairing for preventing a coarse surface of the conductive porous substrate from transferring to the electrolyte membrane; and
 (3) preventing condensation of water vapor generated at a cathode.

It is preferable that the microporous layer includes conductive fine particles. As the conductive fine particles, carbon-based fine particles are preferable in terms of chemical stability, and specifically, carbon black, carbon nanofibers (VGCF and the like, manufactured by Showa Denko K.K.), carbon nanotubes, graphene, milled carbon fibers, and the like are used. Among them, inexpensive carbon black is preferably used, and acetylene black having high conductivity and high water repellency is particularly preferably used.

It is preferable that the microporous layer contains a water repellent material. As the water repellent material, a fluorine-based resin is preferable from the viewpoint of chemical stability, water repellency, and the like, and examples thereof include PTFE, FEP, PFA, and ETFE, similarly to the fluoropolymer preferably used when the conductive porous substrate is subjected to the water repellent treatment. Among them, PTFE or FEP that has high water repellency particularly preferably used.

In general, it is preferable that a coating liquid for forming a microporous layer is prepared by dispersing conductive fine particles and a water repellent material in a dispersion medium such as water using a dispersant. In this case, when a total amount of the conductive fine particles and the dispersant is 100% by mass, the dispersant is preferably used in an amount of 0.1% by mass or more and 5% by mass or less. As the dispersant, a nonionic surfactant is preferable due to a small amount of metal components, and an example thereof includes a polyoxyethylene octylphenyl ether-based "Triton" X100.

In addition, it is effective to add a thickener in order to keep a viscosity of the coating liquid high. As the thickener, for example, a methylcellulose-based thickener, a polyethylene glycol-based thickener, a polyvinyl alcohol-based thickener, and the like are preferably used.

For these dispersants or thickeners, two functions may be applied to the same substances, or a material suitable for each function may be selected. However, in a case where the thickener and the dispersant are separately selected, it is preferable to select a material that does not destroy a dispersion system of the conductive fine particle and a dispersion system of the water repellent material. A total amount of the dispersant and the thickener is preferably 50 parts by mass or more, more preferably 100 parts by mass or more, and still more preferably 200 parts by mass or more, with respect to 100 parts by mass of an addition amount of the conductive fine particles. On the other hand, when the total amount of the dispersant and the thickener is 500 parts by mass or less, steam or decomposed gas are less likely to be generated in the subsequent sintering process, and it is easy to secure safety and productivity.

The coating of the conductive porous substrate with the coating liquid for forming a microporous layer can be performed using various commercially available coating devices. As a coating method, screen printing, rotary screen printing, spray printing, intaglio printing, gravure printing, die coater coating, bar coating, blade coating, roll knife coater coating, and the like can be used. In addition, in a case where the gas diffusion electrode is incorporated in a fuel cell, when smoothness of a coating surface is obtained in order to enhance adhesion with the catalyst layer, coating with a blade coater or a roll knife coater is preferably used.

In order to suppress permeation, the viscosity of the coating liquid for forming a microporous layer is preferably 1.0 Pa·s or more, more preferably 5 Pa·s or more, and still more preferably 7 Pa·s or more. On the other hand, the viscosity is too high, a surface of a coating film is rough, or the coating film cannot be formed in some cases. Therefore, the viscosity of the coating liquid is preferably 20 Pa·s or less.

It is preferable that the gas diffusion electrode coated with the microporous layer is subjected to a drying process for evaporating and drying a solvent in the coating liquid, and a sintering process for thermally decomposing a surfactant used as a dispersant and a thickener and dissolving the water repellent resin to adhere to the conductive fine particles so as to exhibit a function as a binder.

As described above, from the viewpoint of productivity, it is preferable that processes from the coating of the conductive porous substrate with the coating liquid for the microporous layer to the drying and sintering are performed by a so-called roll-to-roll method in which a roll of a long substrate is unwound and wound after being subjected to the above processes.

It is important that a method for producing the gas diffusion electrode according to embodiments of the present invention includes a cutting process using laser processing.

In the production of the gas diffusion electrode, usually, after the formation of the microporous layer, winding is performed once, and then, edge trimming is performed, or in-line edge trimming is performed and winding is performed as it is.

In the edge trimming, cutting is usually performed by shear cutting, and at the edge portion cut at this time, as illustrated in FIG. 1, the carbon fibers protruding from the edge portion when viewed from a plane surface are likely to be generated. In particular, in a case where a conductive porous substrate having a high porosity and a small thickness is used as described above, such protrusion of the carbon fibers is likely to occur at the time of the cutting. In a case where an edge trimmed surface remains as an end surface of the gas diffusion electrode in the production process, the edge trimming is also preferably performed using a laser beam instead of a common shear cutter or the like.

In addition, in a case where a gas diffusion electrode is formed by cutting out in a rectangular sheet shape, a portion to be punched is cut out using a laser beam, while a common Thomson cutter or a blade similar thereto is used usually. In the punching by a Thomson cutter, the microporous layer tends to be in a state where the microporous layer is locally stretched and sagged (an observed state where the microporous layer protruding from the end surface when viewed from a plane surface) depending on the state of the blade. In a case where such sagging occurs at the edge portion of the microporous layer, this portion falls off in the subsequent process and missing of the microporous layer occurs, and when the MEA is incorporated, a space is formed between the missing part and the catalyst layer, and thus, the gas diffusivity is inhibited (flooded) due to accumulation of water in the space, or adhesion between the catalyst layer and the surface of the gas diffusion electrode is locally inhibited due to fragments of the fallen microporous layer, which is not preferable. However, this can be prevented by adopting a cutting process by laser processing.

Any type of laser beam can be used as long as cutting can be performed, and cutting by YAG laser is preferable because cutting can be performed at a low output density and damage to MPL or the carbon paper due to heat is small.

A spot diameter of the laser is preferably 30 μm or less and more preferably 25 μm or less.

An optimal energy density of the laser varies depending on a thickness or a density of the gas diffusion electrode, and is preferably 50 kW·min/m$^2$ or less, more preferably 20 kW·min/m$^2$ or less, and still more preferably 10 kW·min/m$^2$ or less in order to reduce evaporation of an object by heat. When an energy density exceeds the above output density, in a case where the laser is irradiated on the microporous layer surface, the missing due to melting of the microporous layer tends to be large. Since the missing part of the microporous layer becomes a factor that impairs the contact with the catalyst layer when producing an MEA, it is likely to cause degradation effects such as a reduction in cell performance due to accumulation of water in a non-contact space and an increase in contact resistance between the catalyst layer and the microporous layer. In addition, the output density of the laser is preferably 3 kW·min/m$^2$ or more. In a case where the conductive porous substrate having a thickness of 150 μm, a density of 0.3 g/m$^2$, and a porosity of 85% is used in an Example of the present invention, and the microporous layer is coated at 15 g/m$^2$, when YAG laser is used, the characteristics of the present invention can be obtained at 3 kW·min/m$^2$ or more.

Irradiation with a laser beam can be performed on a microporous layer (MPL) formed surface or on an MPL non-formed surface (substrate surface) depending on setting of other conditions, and is preferably performed on the surface on which the MPL is not formed. Although the MPL is likely to be melt-damaged by heat of the laser, when the laser irradiation is performed on the surface on which the MPL is not formed, it is possible to set a necessary minimum laser to be radiated to the MPL, or to suppress the melting damage of the MPL. In particular, in a case where cutting is performed by a high-output laser or the thickness of the substrate is large, irradiation on the MPL non-formed surface is effective. Although the thickness of the substrate, wherein the irradiation on the MPL non-formed surface is effective, depends on an areal weight and a density of the substrate, and further an areal weight and a permeation amount of the microporous layer, in general, in a case where the thickness exceeds 150 μm and the density of the substrate exceeds 0.35 g/cm$^2$, irradiation performed on a rear surface (MPL non-formed surface) is effective.

It is important that the gas diffusion electrode according to embodiments of the present invention satisfies at least one of:

(1) the number of carbon fibers (hereinafter, also referred to as "fluff in an in-plane direction") protruding from a cut edge portion by 20μ or more when viewed from a plane surface is less than 1.0 number/cm, preferably 0.5 number/cm, and more preferably 0.3 number/cm, with respect to a length of the edge portion; and (2) the number of carbon fibers (hereinafter, also referred to as "fluff in an out-plane direction") that are inclined at an angle of 30° or more in an in-plane direction of the gas diffusion electrode and have lengths of 10 μm or more when viewed from a side surface of the cut edge portion is less than 1.0 number/cm, preferably 0.5 number/cm or less, more preferably 0.2 number/cm or less, and still more preferably 0.1 number/cm or less, with respect to the length of the edge portion, and it is more preferable that the gas diffusion electrode of the present invention satisfies both (1) and (2). Therefore, the fluff is less likely to cause damage to the electrolyte membrane, and there is no bad effect by applying the protective film to the edge portion, such that a highly durable fuel cell can be obtained using the gas diffusion layer for a fuel cell.

A gas diffusion electrode with less fluff (fluff in a plane direction and fluff in a direction perpendicular to the plane may be simply and collectively referred to as "fluff") as described above can be preferably produced by performing cutting using a laser beam as described above.

Figure 8:
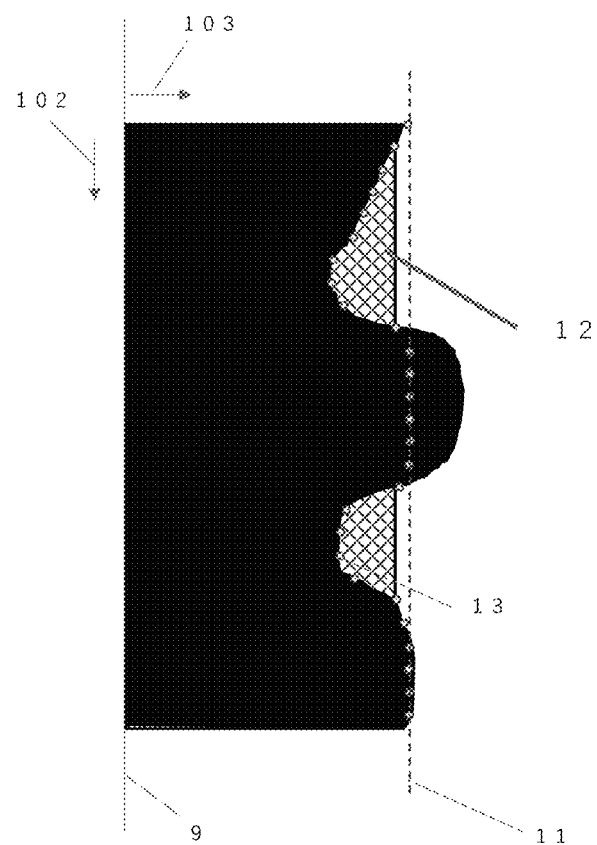
FIG. 8 is an explanatory view showing a method for evaluating missing of a microporous layer in the edge portion of the gas diffusion electrode.

As an index of a magnitude of the missing of the microporous layer in a case where the missing becomes apparent, that is, the exposure of the substrate is observed when viewed from the plane surface of the gas diffusion electrode, as illustrated in FIG. 8, an index (microporous layer missing index) corresponding to a depth when viewed from the plane surface of the missing part can be used. The microporous layer missing index is a value obtained by the following equation, in which when viewed from the plane surface including the edge portion obtained by cutting, a cutting line direction axis is an x-axis, a direction orthogonal to the x-axis and toward the outside of the gas diffusion electrode is a y-axis direction, a y coordinate of each point on a cut surface is yi, and an average y coordinate of the cut surface is ys.

Microporous layer missing index=$(1/n)\Sigma f(yi)$

Here, $f(yi)=ys-yi$ (when $yi<ys$), and $f(yi)=0$ (when $yi \geq ys$), that is, the evaluation is performed using a deviation from an average line (average surface) of a part missing from the average surface when assuming a surface (average surface) by the average line defined by y=ys. In FIG. 8, reference numeral 13 denotes a point for explaining f(yi). An absolute value of a distance from an average line 11 to a point 13 corresponds to f(yi).

In the present invention, the microporous layer missing index is preferably 20 μm or less, more preferably 10 μm or less, and still more preferably 5 μm or less. In addition, a substantial lower limit of the microporous layer missing index is 0.1 μm in terms of accuracy of the laser processing or a structure of the conductive porous substrate or the microporous layer.

In addition, as an evaluation index of the sagging of the microporous layer as described above, a linear index of the cut surface can be used. The linear index of the cut surface is a value obtained by the following equation, in which when viewed from the plane surface including the edge portion obtained by cutting, a cutting line direction axis is an x-axis, a direction orthogonal to the x-axis and toward the outside of the gas diffusion electrode is a y-axis direction, a y coordinate of each measurement point on a cut surface is yi, and an average y coordinate of the cut surface is ys.

Linear index=$[(1/n)\Sigma(yi-ys)^2]^{1/2}$

That is, the evaluation is performed using a standard deviation from the average line (average surface) when assuming a surface (average surface) by the average line defined by y=ys.

The linear index is preferable as the linear index is smaller and is closer to zero, and is preferably 10 μm or less, and when the linear index exceeds 10 μm, fragments of the microporous layer or fragments of the carbon fibers protruding from the substrate fall off from the edge portion of the gas diffusion electrode, and these fragments enter between the gas diffusion electrode and the catalyst layer when assembling the MEA, such that a space can be formed, and the gas diffusivity may be reduced due to accumulation of water in the space. The linear index is more preferably 7 μm or less and still more preferably 5μ or less.

The fluff of the gas diffusion electrode is likely to cause damage to the catalyst layer or the electrolyte membrane when being incorporated in the MEA, and the actual defectiveness can be evaluated by measuring a short-circuit current density.

A catalyst ink is applied to the surface of the microporous layer of the gas diffusion electrode cut into a predetermined size, and the microporous layer is then thermocompression-bonded to the electrolyte membrane, or the gas diffusion electrode is thermocompression-bonded to a catalyst coated membrane (CCM) having a catalyst layer formed on the electrolyte membrane, such that the MEA is formed. With the gas diffusion electrode according to embodiments of the present invention, it is possible to obtain a membrane electrode assembly (MEA) which is less likely to be damaged by fluff formed on the electrolyte membrane without disposing a protective film on the outer peripheral portion of the gas diffusion electrode.

The membrane electrode assembly according to embodiments of the present invention includes the gas diffusion electrode of the present invention.

The membrane electrode assembly of the present invention preferably has a structure in which a protective film is not provided at the outer peripheral portion of the gas diffusion electrode according to embodiments of the present invention. With such a structure, it is possible to prevent degradation of performance as a fuel cell due to non-uniform surface pressure distribution caused by formation of a step between the gas diffusion electrode and the protective film without forming a particularly complicated structure.

EXAMPLES

Hereinafter, the present invention will be specifically described with reference to Examples. Methods for preparing materials used in Examples and various evaluation methods will be described below.

<Material.

[Conductive Porous Substrate (Carbon Paper)]

A carbon paper having a thickness of 150 μm and a porosity of 85% was prepared as follows.

A polyacrylonitrile carbon fiber "TORAYCA" (registered trademark) T300 (average single fiber diameter: 7 μm) manufactured by Toray Industries, Inc. was cut into a length of 12 mm, the cut polyacrylonitrile carbon fiber was subjected to a papermaking step of continuously making a paper using water as a papermaking medium, dipping the paper in a 10% by mass aqueous solution of polyvinyl alcohol, and drying the dipped paper, and the paper was wound into a roll shape, thereby obtaining a long papermaking substrate (carbon fiber papermaking substrate) formed of a carbon fiber and having an areal weight of 15 g/m². An adhesion amount of polyvinyl alcohol corresponds to 20 parts by mass with respect to 100 parts by mass of the papermaking substrate.

Next, a dispersion was prepared by mixing flake graphite (average particle size: 5 μm), a phenolic resin (a mixture of a resol type phenolic resin and a novolak type phenolic resin at a mass ratio of 1:1), and methanol at a mass ratio of 5:10:85. Then, the carbon fiber papermaking substrate was subjected to a resin impregnation step of continuously impregnating the carbon fiber papermaking substrate with the dispersion and drying the carbon fiber papermaking substrate at 100° C. for 5 minutes so that the amount of the resin component (phenolic resin+flake graphite) was 130 parts by mass with respect to 100 parts by mass of the short carbon fibers, and the carbon fiber papermaking substrate was wound into a roll shape.

A pressing machine with a flat plate was set so that hot plates were parallel to each other, a spacer was disposed on a lower hot plate, the carbon fiber papermaking substrate subjected to the resin impregnation step was placed thereon, and a heating and pressurizing treatment was performed at a hot plate temperature of 180° C. for 5 minutes. Thereafter, the carbon fiber papermaking substrate was introduced into a heating furnace having a maximum temperature of 2,400° C. maintained in a nitrogen gas atmosphere to be fired and carbonized, and then, the carbon fiber papermaking substrate was wound into a roll shape, thereby obtaining a carbon paper. The obtained carbon paper had a thickness of 150 μm, a density of 0.25 g/cm³, a porosity of 85%, and a peak of a pore size of 30 μm.

[Coating Liquid for Forming Microporous Layer]

Acetylene black (DENKA BLACK (registered trademark); Denka Company Limited) was used as a conductive fine particle, a PTFE dispersion (POLYFLON (registered trademark) D-210C; Daikin Industries, Ltd.) was used as another material, "Triton" X100 (manufactured by Nacalai Tesque Inc.) was used as a dispersant, and a blending ratio was adjusted using pure water so that acetylene black/PTFE resin=75 parts by mass/25 parts by mass or a solid content (acetylene black and PTFE) was 23% with respect to the total amount. A viscosity of the coating liquid was 8.7 Pa·s at a shear rate of 17/s when measured by an E-type viscometer.

<Evaluation Method>

[Obtaining of Laser Image of Plane Surface of Edge Portion]

Using VK X-100 manufactured by KEYENCE CORPORATION as a laser microscope, a laser image of a plane surface of the gas diffusion electrode was prepared by focusing a focal point of laser at a 10× objective lens magnification between 200 μm above and below a height level of the surface of the microporous layer so that the cut edge portion was fitted in and depth-synthesizing the state where the focal point was focused at each position in a field of view of 1,000 μm×1,412 μm over the entire surface.

[Obtaining of Laser Image of Side Surface of Edge Portion]

Using VK X-100 manufactured by KEYENCE CORPORATION as a laser microscope, a laser image of a side surface of the gas diffusion electrode was prepared by focusing a side surface (cut surface) of the cut edge portion of the gas diffusion electrode at a 50× objective lens magnification between 200 μm above and below from the center of a height level of the cut surface on a screen having a length of about 0.2 mm and depth-synthesizing the state where the focal point was focused at each lens height position in a field of view of 200 μm×275 μm over the entire surface.

[Number of Fluffs in Plane Direction]

In the laser image of the plane surface prepared as described above, carbon fibers having lengths of 20 μm or more among the carbon fibers protruding from the cut edge portion were counted. The operation was performed in a field of view of 20 at a length of the edge portion of about 20 mm per field of view of 1 to calculate an average value per length of the edge portion of 1 cm.

[Linear Index of Edge Portion]

The linear index is a value obtained by the following equation, in which when viewed from the plane surface including an edge portion obtained by cutting, a cutting line direction axis is an x-axis, a direction orthogonal to the x-axis and directed to the outside of the gas diffusion electrode is a y-axis direction, a y coordinate of each measurement point of the cut surface is yi, and an average y coordinate of the cut surface is ys.

$$\text{Linear index} = [(1/n)\Sigma(yi-ys)^2]^{1/2}$$

Figure 7:
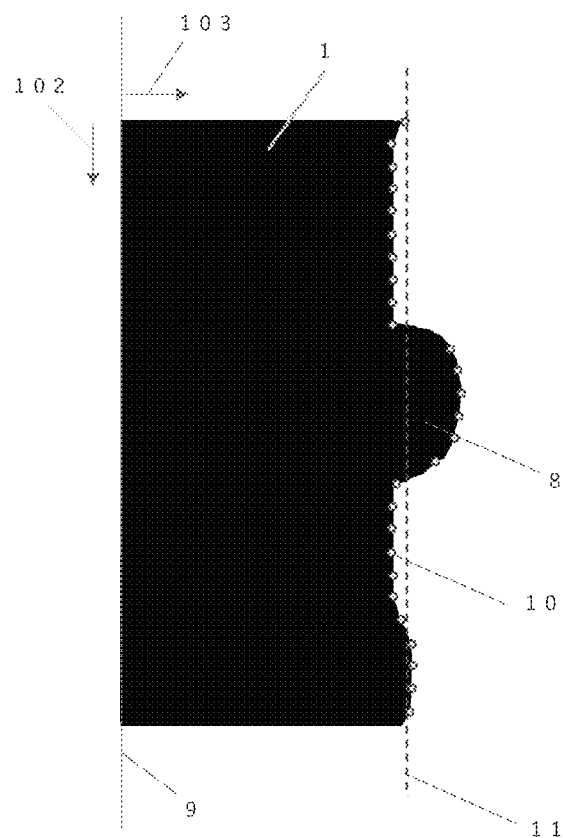
FIG. 7 is an explanatory view showing a method for evaluating linearity of the edge portion of the gas diffusion electrode.

Specifically, in the laser image of the plane surface of the edge portion described above, as schematically illustrated in FIG. 7, an arbitrary reference line (y=0) (9) was drawn parallel to the cut line direction, 100 coordinate points (10) of the edge portion of the cut surface were designated at intervals of 20 μm in the x-axis 102 direction, the coordinate (xi,yi) of each coordinate point was measured (unit: μm), and the average coordinate ys of yi was obtained. In FIG. 7, a straight line passing through the average coordinate ys and parallel to the reference line (9) is indicated by an average line (11). Then, a root mean square of a deviation between ys and each measurement point yi (standard deviation of the value of yi) was defined as a linear index of the cut surface, and this was used as an index of the linearity of the cut surface.

[Microporous Layer Missing Index of Edge Portion]

The microporous layer missing index is obtained by the following equation, in which when viewed from the plane surface including the edge portion obtained by cutting, a cutting line direction axis is an x-axis, a direction orthogonal to the x-axis and toward the outside of the gas diffusion electrode is a y-axis direction, a y coordinate of each point on a cut surface is yi, and an average y coordinate of the cut surface is ys.

Microporous layer missing index=$(1/n)\Sigma f(yi)$

Here, $f(yi)=ys-yi$ (when $yi<ys$), and $f(yi)=0$ (when$\geq ys$), specifically, as schematically illustrated in FIG. 8, with respect to the average line (11) obtained as described above, among the coordinates of the edge portion of the microporous layer, for the y-coordinate yi of the coordinate points existing inside the average line (on the gas diffusion electrode side), the deviation from the average line was included in the microporous layer missing index (when yi<ys, f(yi)=ys−yi). In addition, in the coordinate points outside the average line, the deviation was uniformly 0 (when yi≥ys, f(yi)=0). The average value of these deviations was taken as the microporous layer missing index, and was used as an index of a magnitude of the missing of the microporous layer.

[Number of Fluffs in Out-Plane Direction]

In the laser image of the side surface prepared as described above, carbon fiber fragments inclined at 30° or more with respect to the in-plane direction of the gas diffusion electrode and having lengths of 10 μm or more were determined as fluff in the out-plane direction in the cross section. The operation was performed in a field of view of 20 with a field of view of 200 μm×275 μm to calculate an average per length of the edge portion of 1 cm.

[Evaluation of Short-Circuit Current Density]

A short-circuit current density was measured by the following procedures (1) to (3).

(1) A low density polyethylene (LDPE) film (thickness 10 μm) is stacked on the surface of the microporous layer of the gas diffusion electrode. Here, the gas diffusion electrode is a square having one side of 2.24 cm, LDPE is a square having one side of 6 cm or more, and the LDPE film is stacked so that each side of the LDPE film is parallel to each side of the gas diffusion electrode and the center of the LDPE film coincides with the center of the gas diffusion electrode.

(2) The stacked LDPE film and gas diffusion electrode are interposed between two gold-plated stainless steel block electrodes each having a square shape with one side of 3 cm, and the area of 5 cm$^2$ (2.24 cm×2.24 cm) of the gas diffusion electrode is pressurized at a pressure of 5.38 MPa. In this case, each side of the surface of the stainless steel block electrodes and each side of the gas diffusion electrode interposed between the stainless steel block electrodes are arranged in parallel, and the LDPE film and the gas diffusion electrode are interposed so that the center of the stainless steel block electrode coincides with the center of the gas diffusion electrode.

(3) A direct current voltage of 2.0 V is applied between the gold-plated stainless steel block electrodes using a digital multimeter (INSTEK Digital Dual Measurement Multimeter GDM-826), a current between the electrodes is measured, and the obtained value is defined as a short-circuit current. The short-circuit current is divided by the area of 5 cm$^2$ of the gas diffusion electrode to which the pressure is applied to obtain a short-circuit current density. As for the short-circuit current density, a measurement sample of the gas diffusion electrode was changed and (1) to (3) were repeated 10 times to obtain an average value. When the short-circuit current density is 15 mA/cm$^2$ or less, it is considered that the short-circuit resistance performance is more excellent than that of the gas diffusion electrode according to the related art.

In addition, evaluation was also performed by the probability that the obtained value exceeded 10 mA/cm$^2$ (short-circuit probability) among 10 times of measurement.

[Anti-Flooding Properties]

The membrane electrode assembly of each Example was incorporated into a single cell for a fuel cell, and the cell was humidified so that a cell temperature was 40° C., a fuel utilization efficiency was 70%, an air utilization efficiency was 40%, a dew point of hydrogen on an anode side was 75° C., and a dew point of air on a cathode side was 60° C. to cause power generation, and a value of the current density (limit current density) at which power generation was stopped when the current density was increased was used as an index of an anti-flooding property.

Note that in a case where the anti-flooding properties are evaluated from the gas diffusion electrode in a state before the membrane electrode assembly is formed, the procedure for producing the membrane electrode assembly (MEA) described in Example 1 can be used as a reference.

Example 1

(Gas Diffusion Electrode)

While the carbon paper prepared in accordance with the above was conveyed using a winding-type conveyance device, the carbon paper was dipped in a dipping tank filled with a fluoropolymer dispersion (PTFE dispersion D-210C manufactured by Daikin Industries, Ltd., diluted with water so that a concentration of PTFE was 2% by mass) to perform a water repellent treatment, the carbon paper was dried in a dryer set at 100° C., and then the carbon paper was wound, thereby obtaining a conductive porous substrate subjected to the water repellent treatment.

Next, a die coater having an application width of 500 mm was attached to a continuous coater, and the coating liquid for the microporous layer described above was applied so that an areal weight of the microporous layer after sintering was 25 g/m$^2$, and the microporous layer was dried and then was wound together with an interleaf. The rolled product was set in an unwinding and winding-type cutting machine equipped with a shear cutter, and edge trimming was performed at a speed of 10 m/min. A trimming width was 5 mm on one side and 10 mm at both sides.

Using YAG laser, all four sides of the rolled product were cut into a square pattern having one side with a length of 22.4 mm to produce a gas diffusion electrode. Laser irradiation was performed on the microporous layer formed surface (surface A) under conditions of an output of 2 W, a spot diameter of 30 μm, and a cutting speed (laser scanning speed) of 3 m/min.

(Membrane Electrode Assembly)

A catalyst layer "PRIMER" (registered trademark) (manufactured by W. L. Gore & Associates G.K.) was laminated on both surfaces of an electrolyte membrane "Gore Select" (registered trademark) (manufactured by W. L. Gore & Associates G.K.) to obtain an electrolyte membrane/catalyst layer integrated product. Using the gas diffusion electrode of each Example, the electrolyte membrane/catalyst layer integrated product was interposed between the gas diffusion electrodes so that the microporous layers of the gas diffusion electrodes were in contact with the catalyst layers of both sides of the electrolyte membrane/catalyst layer integrated product, and hot pressing was performed at 130° C. to produce a membrane electrode assembly (MEA). Note that a protective film was not provided on the membrane electrode assembly.

Example 2

A gas diffusion electrode and a membrane electrode assembly (MEA) were produced in the same manner as in Example 1, except that the cutting speed by laser irradiation was set to 6 m/min (energy per irradiation area by laser irradiation was ½).

Example 3

A gas diffusion electrode and a membrane electrode assembly (MEA) were produced in the same manner as in Example 1, except that the cutting speed by laser irradiation was set to 12 m/min.

Example 4

A gas diffusion electrode and a membrane electrode assembly (MEA) were produced in the same manner as in Example 3, except that the laser irradiation was performed on the microporous layer non-formed surface (surface B).

Example 5

A gas diffusion electrode and a membrane electrode assembly (MEA) were produced in the same manner as in Example 2, except that the laser irradiation was performed on the microporous layer non-formed surface.

Example 6

A gas diffusion electrode and a membrane electrode assembly (MEA) were produced in the same manner as in Example 1, except that the cutting speed by laser irradiation was set to 20 m/min, and the laser irradiation was performed on the microporous layer non-formed surface.

Comparative Example 1

A gas diffusion electrode was produced in the same manner as in Example 1, except that the cutting was performed without using laser and using a Thomson cutter (TBC) having one side of 2.24 cm. When viewed from the plane surface of the edge portion of Comparative Example 1, the substrate was not exposed due to the missing of the microporous layer, and therefore, the microporous layer missing index was not evaluated ("–" in the table), but a part of the microporous layer was in a state of sagging and protruding.

Example 7

A gas diffusion electrode and a membrane electrode assembly (MEA) were produced in the same manner as in Example 6, except that the laser irradiation was performed on the microporous layer formed surface.

Example 8

A gas diffusion electrode and a membrane electrode assembly (MEA) were produced in the same manner as in Example 4, except that the laser type was changed to carbon dioxide laser (CDL), and the irradiation was performed at an output of 10.5 W, a spot diameter of 72 μm, and a cutting speed of 1.5 m/min.

Example 9

A gas diffusion electrode and a membrane electrode assembly (MEA) were produced in the same manner as in Example 7, except that the output of the carbon dioxide laser was 15 W and the cutting speed was 3.0 m/min.

Example 10

A gas diffusion electrode and a membrane electrode assembly (MEA) were produced in the same manner as in Example 7, except that the output of the carbon dioxide laser was 15 W and the cutting speed was 1.5 m/min.

Comparative Example 2

An attempt was made to produce a gas diffusion electrode in the same manner as in Example 7, except that the output of the carbon dioxide laser was 7.5 W and the cutting speed was 1.5 m/min. However, a portion that could not be cut was generated under these conditions, and the gas diffusion electrode could not be cut out.

Table 1 shows the results of comparison of the cut surfaces of the gas diffusion electrodes produced in Example 1 to 10 and Comparative Examples 1 and 2 and evaluation of the short-circuit current.

TABLE 1-1

| Item | Unit | Example 1 | Example 2 | Example 3 | Example 4 | Example 5 | Example 6 |
|---|---|---|---|---|---|---|---|
| Cutting method | | YAG | YAG | YAG | YAG | YAG | YAG |
| Cutting speed | m/min | 3 | 6 | 12 | 12 | 6 | 20 |
| Laser output | W | 2 | 2 | 2 | 2 | 2 | 2 |
| Energy density | kW · min/m$^2$ | 22.2 | 11.1 | 5.6 | 5.6 | 11.1 | 3.3 |
| Laser irradiation surface | | Surface A | Surface A | Surface A | Surface B | Surface B | Surface B |
| Number of fluffs in in-plane direction | number/cm | 0.45 | 0.41 | 0.66 | 0.29 | 0.23 | 0.67 |
| Number of fluffs in out-plane direction | number/cm | 0.00 | 0.00 | 0.00 | 0.00 | 0.00 | 0.00 |
| Linear index of edge portion | μm | 8.9 | 2.8 | 2.7 | 2.6 | 2.5 | 1.8 |
| Microporous layer missing index of edge portion | μm | 24.5 | 6.7 | 5.6 | 2.7 | 3.2 | 1.5 |

TABLE 1-1-continued

| Item | Unit | Example 1 | Example 2 | Example 3 | Example 4 | Example 5 | Example 6 |
|---|---|---|---|---|---|---|---|
| Short-circuit current density | $mA/cm^2$ | 0 | 0 | 0 | 0 | 0 | 0 |
| Short-circuit probability | % | 0 | 0 | 0 | 0 | 0 | 0 |
| Anti-flooding properties (at 40° C.) | $A/cm^2$ | 1.48 | 1.64 | 1.64 | 1.72 | 1.69 | 1.72 |

YAG: YAG laser
CDL: carbon dioxide gas laser
TBC: Thomson cutter
Surface A: microporous layer formed surface
Surface B: microporous layer non-formed surface

TABLE 1-2

| Item | Unit | Comparative Example 1 | Example 7 | Example 8 | Example 9 | Example 10 | Comparative Example 2 |
|---|---|---|---|---|---|---|---|
| Cutting method | | TBC | YAG | CDL | CDL | CDL | CDL |
| Cutting speed | m/min | — | 20 | 1.5 | 3 | 1.5 | 1.5 |
| Laser output | W | — | 2 | 10.5 | 15 | 15 | 7.5 |
| Energy density | $kW \cdot min/m^2$ | — | 3.3 | 97.2 | 69.4 | 138.9 | 69.4 |
| Laser irradiation surface | | — | Surface A | Surface B | Surface B | Surface B | Surface B |
| Number of fluffs in in-plane direction | number/cm | 6.8 | 1.3 | 0.8 | 0.2 | 0.08 | Cannot be cut |
| Number of fluffs in out-plane direction | number/cm | 5.5 | 0.17 | 0.20 | 0.20 | 0.10 | |
| Linear index of edge portion | μm | 11.0 | 2.5 | 12.6 | 10.9 | 6.9 | |
| Microporous layer missing index of edge portion | μm | — | 3.0 | 6.85 | 5.3 | 11.8 | |
| Short-circuit current density | $mA/cm^2$ | 18 | 6 | 7 | 5 | 3 | |
| Short-circuit probability | % | 80 | 30 | 30 | 20 | 40 | |
| Anti-flooding properties (at 40° C.) | $A/cm^2$ | — | 1.59 | 1.53 | 1.53 | 1.50 | |

YAG: YAG laser
CDL: carbon dioxide gas laser
TBC: Thomson cutter
Surface A: microporous layer formed surface
Surface B: microporous layer non-formed surface

DESCRIPTION OF REFERENCE SIGNS

1: Gas diffusion electrode (laser image of plane surface of edge portion)
2: Microporous layer (surface)
3: Fluff in in-plane direction
4: Gas diffusion electrode (laser image of side surface of edge portion)
5: Fluff in out-plane direction
6: Microporous layer (side surface)
7: Conductive porous substrate (carbon paper)
8: Sagging of microporous layer
9: Reference line (y=0)
10: Coordinate point of edge portion of gas diffusion electrode
11: Average line
12: Missing part of microporous layer (exposed part of substrate)
13: Point for explaining f(yi)
101: Arrow indicating plane direction of gas diffusion electrode
102: Arrow indicating x-axis direction
103: Arrow indicating Y-axis direction

The invention claimed is:

1. A gas diffusion electrode comprising:
a conductive porous substrate containing carbon fibers; and
a microporous layer formed on at least one surface of the conductive porous substrate,
wherein the gas diffusion electrode satisfies at least one of the following (1) and (2):
(1) the number of carbon fibers protruding from an edge portion by 20 μm or more when viewed from a plane surface of the microporous layer is less than 1.0 number/cm with respect to a length of the edge portion; and
(2) the number of carbon fibers that are inclined at an angle of 30° or more in an in-plane direction of the gas diffusion electrode and have lengths of 10 μm or more when viewed from a side surface of the edge portion is less than 1.0 number/cm with respect to the length of the edge portion, wherein the side surface of the edge portion consists of a side surface of the microporous layer and a side surface of the conductive porous substrate.

2. The gas diffusion electrode according to claim 1, wherein a linear index of the edge portion is 10 μm or less.

3. The gas diffusion electrode according to claim 2, wherein the linear index of the edge portion is 7 μm or less.

4. The gas diffusion electrode according to claim 1, wherein a microporous layer missing index of the edge portion is 20 μm or less.

5. The gas diffusion electrode according to claim 4, wherein the microporous layer missing index of the edge portion is 5 μm or less.

6. The gas diffusion electrode according to claim 1, wherein the conductive porous substrate is a carbon paper.

7. The gas diffusion electrode according to claim 1, wherein a porosity of the conductive porous substrate is 80% or more.

8. The gas diffusion electrode according to claim 1, wherein a thickness of the conductive porous substrate is 220 μm or less.

9. The gas diffusion electrode according to claim 1, wherein the conductive porous substrate has a peak of a pore size in a region of 10 μm or more and 100 μm or less.

10. A membrane electrode assembly obtained by using the gas diffusion electrode according to claim 1, wherein a protective film is not provided on an outer peripheral portion of the gas diffusion electrode.

11. A method for producing the gas diffusion electrode according to claim 1, the method comprising a cutting process using laser processing.

12. The method for producing the gas diffusion electrode according to claim 11, wherein the laser processing is performed by YAG laser.

13. The method for producing the gas diffusion electrode according to claim 11, wherein in the laser processing, a surface on which the microporous layer is not formed is irradiated with laser.

14. The method for producing the gas diffusion electrode according to claim 11, wherein in the laser processing, an energy density is 50 kW·min/$m^2$ or less.

* * * * *